(12) United States Patent
Eckert et al.

(10) Patent No.: US 9,507,410 B2
(45) Date of Patent: Nov. 29, 2016

(54) DECOUPLED SELECTIVE IMPLEMENTATION OF ENTRY AND EXIT PREDICTION FOR POWER GATING PROCESSOR COMPONENTS

(71) Applicant: Advanced Micro Devices, Inc., Sunnyvale, CA (US)

(72) Inventors: Yasuko Eckert, Kirkland, WA (US); Manish Arora, Dublin, CA (US); Indrani Paul, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 217 days.

(21) Appl. No.: 14/310,908

(22) Filed: Jun. 20, 2014

(65) Prior Publication Data
US 2015/0370311 A1 Dec. 24, 2015

(51) Int. Cl.
*G06F 1/32* (2006.01)

(52) U.S. Cl.
CPC .......... *G06F 1/3296* (2013.01); *G06F 1/3293* (2013.01)

(58) Field of Classification Search
CPC .... G06F 1/3203; G06F 1/329; G06F 1/3293; G06F 1/3296
USPC ........................................ 713/320, 323, 324
See application file for complete search history.

(56) References Cited

U.S. PATENT DOCUMENTS

| | | | |
|---|---|---|---|
| 5,758,143 A | 5/1998 | Levitan | |
| 6,457,134 B1 | 9/2002 | Lemke et al. | |
| 7,143,273 B2 | 11/2006 | Miller | |
| 7,266,707 B2 * | 9/2007 | Ngo | G06F 1/3228 257/207 |
| 7,490,302 B1 * | 2/2009 | Rahman | G06F 17/5054 716/100 |
| 7,868,479 B2 * | 1/2011 | Subramaniam | G06F 1/3203 307/38 |
| 8,245,065 B2 * | 8/2012 | Niggemeier | G06F 9/3836 712/214 |
| 8,949,554 B2 | 2/2015 | Sadowski et al. | |
| 9,176,572 B2 | 11/2015 | Thomson | |
| 9,183,144 B2 * | 11/2015 | Wang | G06F 12/0811 |
| 2003/0093653 A1 | 5/2003 | Oga | |
| 2006/0184287 A1 * | 8/2006 | Belady | G06F 1/3203 700/291 |
| 2006/0248436 A1 | 11/2006 | La-France-Linden et al. | |
| 2007/0288414 A1 | 12/2007 | Barajas | |
| 2008/0209243 A1 | 8/2008 | Ghiasi et al. | |
| 2008/0276238 A1 | 11/2008 | Levanoni et al. | |
| 2009/0150696 A1 * | 6/2009 | Song | G06F 1/3203 713/323 |
| 2009/0158067 A1 | 6/2009 | Bodas et al. | |
| 2009/0235105 A1 | 9/2009 | Branover et al. | |

(Continued)

FOREIGN PATENT DOCUMENTS

EP 2017354 3/2011

OTHER PUBLICATIONS

U.S. Appl. No. 14/488,874, filed Sep. 17, 2014, listing Fulya Kaplan, et al. as inventors, entitled "Predictive Management of Heterogeneous Processing Systems".

(Continued)

*Primary Examiner* — Chun Cao

(57) ABSTRACT

Power gating logic detects a transition of a component of a processing device into an idle state. In response to detecting the transition, the entry/exit power gating logic selectively implements one or more entry prediction techniques for power gating the component based on estimates of reliability of the entry prediction techniques. The entry/exit power gating logic also selectively implements one or more exit prediction techniques for exiting the power gated state based on estimates of reliability of the exit prediction techniques.

20 Claims, 9 Drawing Sheets

(56) References Cited

U.S. PATENT DOCUMENTS

| | | | |
|---|---|---|---|
| 2010/0058078 | A1 | 3/2010 | Branover et al. |
| 2010/0107174 | A1 | 4/2010 | Suzuki et al. |
| 2010/0138456 | A1 | 6/2010 | Aghili |
| 2010/0145896 | A1 | 6/2010 | Yuta |
| 2010/0169683 | A1 | 7/2010 | Wang et al. |
| 2010/0287394 | A1 | 11/2010 | Branover et al. |
| 2011/0040995 | A1 | 2/2011 | Basak et al. |
| 2011/0078478 | A1 | 3/2011 | Branover et al. |
| 2011/0153536 | A1 | 6/2011 | Yang |
| 2011/0161627 | A1 | 6/2011 | Song et al. |
| 2011/0291748 | A1 | 12/2011 | Li et al. |
| 2013/0007494 | A1 | 1/2013 | Branover et al. |
| 2013/0080813 | A1 | 3/2013 | Tarui |
| 2013/0097415 | A1 | 4/2013 | Li et al. |
| 2013/0238628 | A1 | 9/2013 | Behnen et al. |
| 2014/0006817 | A1* | 1/2014 | Bonen ............... G06F 1/3243 713/320 |
| 2014/0086406 | A1 | 3/2014 | Polzin |
| 2014/0089697 | A1* | 3/2014 | Kim .................. G06F 1/26 713/320 |
| 2014/0149772 | A1 | 5/2014 | Arora et al. |
| 2014/0173206 | A1 | 6/2014 | Wang et al. |
| 2014/0181553 | A1 | 6/2014 | Eckert et al. |
| 2014/0181556 | A1 | 6/2014 | Eckert et al. |
| 2015/0067357 | A1* | 3/2015 | Arora ................. G06F 1/3206 713/300 |
| 2015/0067700 | A1 | 3/2015 | Kim et al. |
| 2015/0100810 | A1 | 4/2015 | Sreekumaran et al. |
| 2015/0170048 | A1 | 6/2015 | Lin |
| 2015/0170049 | A1 | 6/2015 | Mann |
| 2015/0198991 | A1* | 7/2015 | Bircher ............. G06F 1/3243 713/323 |

OTHER PUBLICATIONS

Final Office Action mailed Dec. 14, 2015 for U.S. Appl. No. 14/015,578, 20 pages.
Canturk Isci et al., "Live, Runtime Phase Monitoring and Prediction on Real Systems with Application to Dynamic Power Management", MICRO-39. 39th Annual IEEE/ACM International Symposium on Microarchitecture, Oct. 9, 2006, 12 pages.
William Lloyd Bircher et al., "Predictive Power Management for Multi-Core Processors", WEED 2010—Workshop on Energy-Efficient Design, Jun. 1, 2010, 7 pages.
Yuki Abe et al., "Power and Performance Analysis of GPU-Accelerated Systems", USENIX, HotPower'12, 2012, 6 pages.
Non-Final Office Action mailed Oct. 16, 2015 for U.S. Appl. No. 14/488,874, 21 pages.
Ravi Kokku, et al., "Adaptive Processor Allocation in Packet Processing Systems", 2004, 14 pages.
Non-Final Office Action mailed Jul. 14, 2015 for U.S. Appl. No. 14/015,578, 27 pages.
2nd Generation Intel Core Processor Family Desktop: Datasheet, vol. 1, Supporting Intel Core i7, i5 and i3 Desktop Processor Series, Intel, Sep. 2012, 112 pages.
Non-Final Office Action mailed Sep. 11, 2015 for U.S. Appl. No. 14/152,826, 28 pages.
International Search Report and Written Opinion in International Application No. PCT/US2013/075311, mailed Apr. 23, 2014, 12 pages.
Hu et al. "Microarchitectural Techniques for Power Gating of Execution Units", Proceedings of International Symposium on Low Power Electronics and Design, Aug. 2004, 6 pages.
BIOS and Kernel Developer's Guide (BKDG) for AMD Family 15h Models 00h-0Fh Processors, Jan. 2013, 639 pages.
U.S. Appl. No. 61/730,614, filed Nov. 28, 2012, entitled Effective Power Gating Through Idle Period Entry and Exit Prediction.
U.S. Appl. No. 14/063,194, filed Dec. 25, 2013, entitled "Global History Pattern Based Power Gating Entry Decisions".
U.S. Appl. No. 14/152,826, filed Jan. 10, 2014, entitled "Predicting Power Management State Durations on a Per-Process Basis".
U.S. Appl. No. 14/015,578, filed Aug. 30, 2013, entitled "Prediction for Power Gating".
U.S. Appl. No. 14/146,588, filed Jan. 2, 2014, entitled "Configuring Processor Policies Based on Predicted Durations of Active Performance States".
U.S. Appl. No. 14/146,591, filed Jan. 2, 2014, entitled "Power Gating Based on Cache Dirtiness".
U.S. Appl. No. 13/723,868, filed Dec. 21, 2012, entitled "Idle Phase Prediction for Integrated Circuits".
Final Office Action mailed May 26, 2016, for U.S. Appl. No. 14/015,578 14 pages.
Final Office Action mailed May 18, 2016, for U.S. Appl. No. 14/488,874 30 pages.
Non-Final Office Action mailed Apr. 5, 2016, for U.S. Appl. No. 14/146,591, 45 pages.
Final Office Action mailed Mar. 3, 2016 for U.S. Appl. No. 14/152,826, 18 pages.
Non-Final Office Action mailed Jun. 10, 2016 for U.S. Appl. No. 14/146,588, 49 pages.

* cited by examiner

DECOUPLED SELECTIVE IMPLEMENTATION OF ENTRY AND EXIT PREDICTION FOR POWER GATING PROCESSOR COMPONENTS

BACKGROUND

Field of the Disclosure

The present disclosure relates generally to processing devices and, more particularly, to power gating components of processing devices.

Description of the Related Art

Components in processing devices such as central processing units (CPUs), graphics processing units (GPUs), and accelerated processing units (APUs) can conserve power by transitioning between different power management states. For example, a component can conserve power by idling when there are no instructions to be executed by the component. If the component is idle for a relatively long time, power supplied to the component may then be gated so that no current is supplied to the component, thereby reducing stand-by and leakage power consumption. For example, a processor core in a CPU can be power gated if the processor core has been idle for more than a predetermined time interval. However, power management techniques that change the power management state of a component of a processing device can consume a large amount of system resources relative to the resources conserved by the state change. For example, power gating a processor core requires flushing caches in the processor core and saving the information that defines the state of the processor core, which consumes both time and power. Power gating also exacts a performance cost to return the processor core to an active state, such as when the saved state information must be copied back into registers in the processor core.

The processing device may be designed to balance the costs and benefits of power gating a component by power gating the component after it has been idle for a fixed period of time. However, timer-based approaches have a number of drawbacks. For example, an idle processor core in a CPU may be power gated (i.e., the state of the processor core may be changed from an idle power management state to a power gated power management state) just before the processor core needs to reenter the active state, which may lead to unnecessary delays and waste of the power needed to flush the caches associated with the processor core, save the state information for the processor core, and then restore the state information to return the processor core to the active state. For another example, if the processor core is not going to be used for a relatively long time, the processor core may remain in the idle state for too long before entering the power-gated state, thereby wasting the resources that could have been conserved by entering the power-gated state earlier.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
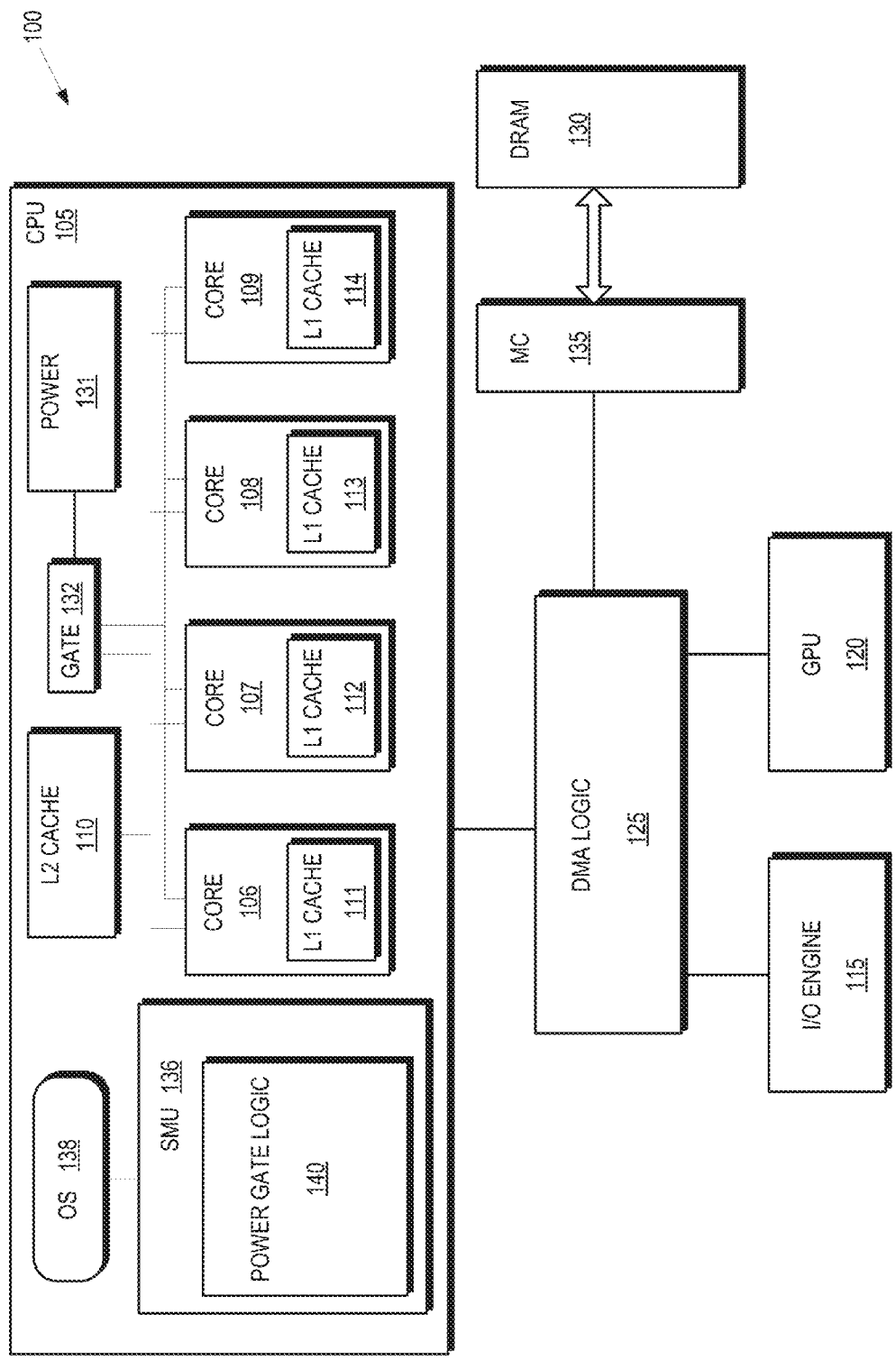
FIG. 1 is a block diagram of a processing device in accordance with some embodiments.

In order to better determine whether to transition between two power management states of a component, a processing device can employ prediction techniques to predict whether entering a different power management state, such as a power gated state, is likely to produce a net power savings. The power management state of the component can be changed from the current power management state to a different power management state if the prospective performance and power gains exceed the prospective losses incurred by transitioning into the different power management state. For example, to decide whether to transition from an idle power management state to a power-gated power management state, a predicted idle time can be set equal to an average duration of the last few idle events during which the processing device was in an idle state. The processor core may enter the power gated state if the predicted idle time is greater than a break-even idle time at which the net energy savings of the transition is equal to zero. Using predictions to determine when to enter a new power management state has a number of drawbacks. For example, interrupts may be used to wake up a power gated processor core. Following the interrupt, a finite period of time elapses while the state information for the processor core is restored. This latency represents a performance cost associated with power gating the processor core. For another example, prediction techniques are not always reliable and using an unreliable prediction technique can increase the energy and performance costs associated with power gating.

The costs of transitioning between power management states may be reduced, and the accuracy of the predicted benefits of the transition may be increased, by independently selecting one of a plurality of entry prediction techniques based on estimates of reliabilities of the entry prediction techniques and selecting one of a plurality of exit prediction techniques based on estimates of reliabilities of the exit prediction techniques. The entry prediction techniques are used to predict the costs and benefits of entering a new power management state such as a power-gated state. In some embodiments, the costs and benefits of entering the power-gated state may be determined based on predicted durations of the idle state of the component if the predicted durations are expected to be reliable. Otherwise, the costs and benefits of entering the power-gated state may be estimated using a static wait timer. The exit prediction techniques are used to predict when a component is expected to exit the new power management state, e.g., when a power gated component is likely to be activated by an interrupt or other event. The exit prediction techniques may begin waking up a power gated component before the predicted activation time to reduce the latency associated with waking up the power gated component. In some embodiments, the exit time may be predicted based upon a model of the relationship between one or more previous idle times and a subsequent idle time. However, if the model is not expected to provide a reliable prediction of the subsequent idle time, the exit time may not be predicted and the component may wait for an interrupt.

FIG. 1 is a block diagram of a processing device 100 in accordance with some embodiments. The processing device 100 includes a central processing unit (CPU) 105 for executing instructions. Some embodiments of the CPU 105 include multiple processor cores 106-109 that can independently execute instructions concurrently or in parallel. The CPU 105 shown in FIG. 1 includes four processor cores 106-109. However, persons of ordinary skill in the art having benefit of the present disclosure should appreciate that the number of processor cores in the CPU 105 is a matter of design choice. Some embodiments of the CPU 105 may include more or fewer than the four processor cores 106-109 shown in FIG. 1.

The CPU 105 implements caching of data and instructions and some embodiments of the CPU 105 may therefore implement a hierarchical cache system. For example, the CPU 105 may include an L2 cache 110 for caching instructions or data that may be accessed by one or more of the processor cores 106-109. Each of the processor cores 106-109 may also implement an L1 cache 111-114. Some embodiments of the L1 caches 111-114 may be subdivided into an instruction cache and a data cache.

The processing device 100 includes an input/output engine 115 for handling input or output operations associated with elements of the processing device such as keyboards, mice, printers, external disks, and the like. A graphics processing unit (GPU) 120 is also included in the processing device 100 for creating visual images intended for output to a display. Some embodiments of the GPU 120 may include multiple cores and/or cache elements that are not shown in FIG. 1 interest of clarity.

The processing device 100 shown in FIG. 1 also includes direct memory access (DMA) logic 125 for generating addresses and initiating memory read or write cycles. The CPU 105 may initiate transfers between memory elements in the processing device 100 such as the DRAM memory 130 and/or other entities connected to the DMA logic 125 including the CPU 105, the I/O engine 115 and the GPU 120. Some embodiments of the DMA logic 125 may also be used for memory-to-memory data transfer or transferring data between the cores 106-109. The CPU 105 can perform other operations concurrently with the data transfers being performed by the DMA logic 125 which may provide an interrupt to the CPU 105 to indicate that the transfer is complete. A memory controller (MC) 135 may be used to coordinate the flow of data between the DMA logic 125 and the DRAM 130.

Some embodiments of the CPU 105 may implement a system management unit (SMU) 136 that may be used to carry out policies set by an operating system (OS) 138 of the CPU 105. The OS 138 may be implemented using one or more of the processor cores 106-109. Some embodiments of the SMU 136 may be used to manage thermal and power conditions in the CPU 105 according to policies set by the OS 138 and using information that may be provided to the SME 136 by the OS 138, such as power consumption by entities within the CPU 105 or temperatures at different locations within the CPU 105. The SMU 136 may therefore be able to control power supplied to entities such as the cores 106-109, as well as adjusting operating points of the cores 106-109, e.g., by changing an operating frequency or an operating voltage supplied to the cores 106-109.

The SMU 136 can initiate transitions between power management states of the components of the processing device 100 such as the CPU 105, the GPU 120, or the cores 106-109 to conserve power or enhance performance. Exemplary power management states may include an active state, an idle state, a power-gated state, or other power management states in which the component may consume more or less power. Some embodiments of the SMU 136 determine whether to initiate transitions between the power management states by comparing the performance or power costs of the transition with the performance gains or power savings of the transition.

Transitions may occur from higher to lower power management states or from lower to higher power management states. For example, some embodiments of the processing device 100 include a power supply 131 that is connected to gate logic 132. The gate logic 132 can control the power supplied to the cores 106-109 and can gate the power provided to one or more of the cores 106-109, e.g., by opening one or more circuits to interrupt the flow of current to one or more of the cores 106-109 in response to signals or instructions provided by the SMU 136. The gate logic 132 can also re-apply power to transition one or more of the cores 106-109 out of the power-gated state to an idle or active state, e.g., by closing the appropriate circuits. However, power gating components of the processing device 100 consumes system resources. For example, power gating the CPU 105 or the cores 106-109 may require flushing some or all of the L2 cache 110 and the L1 caches 111-114.

Figure 2:
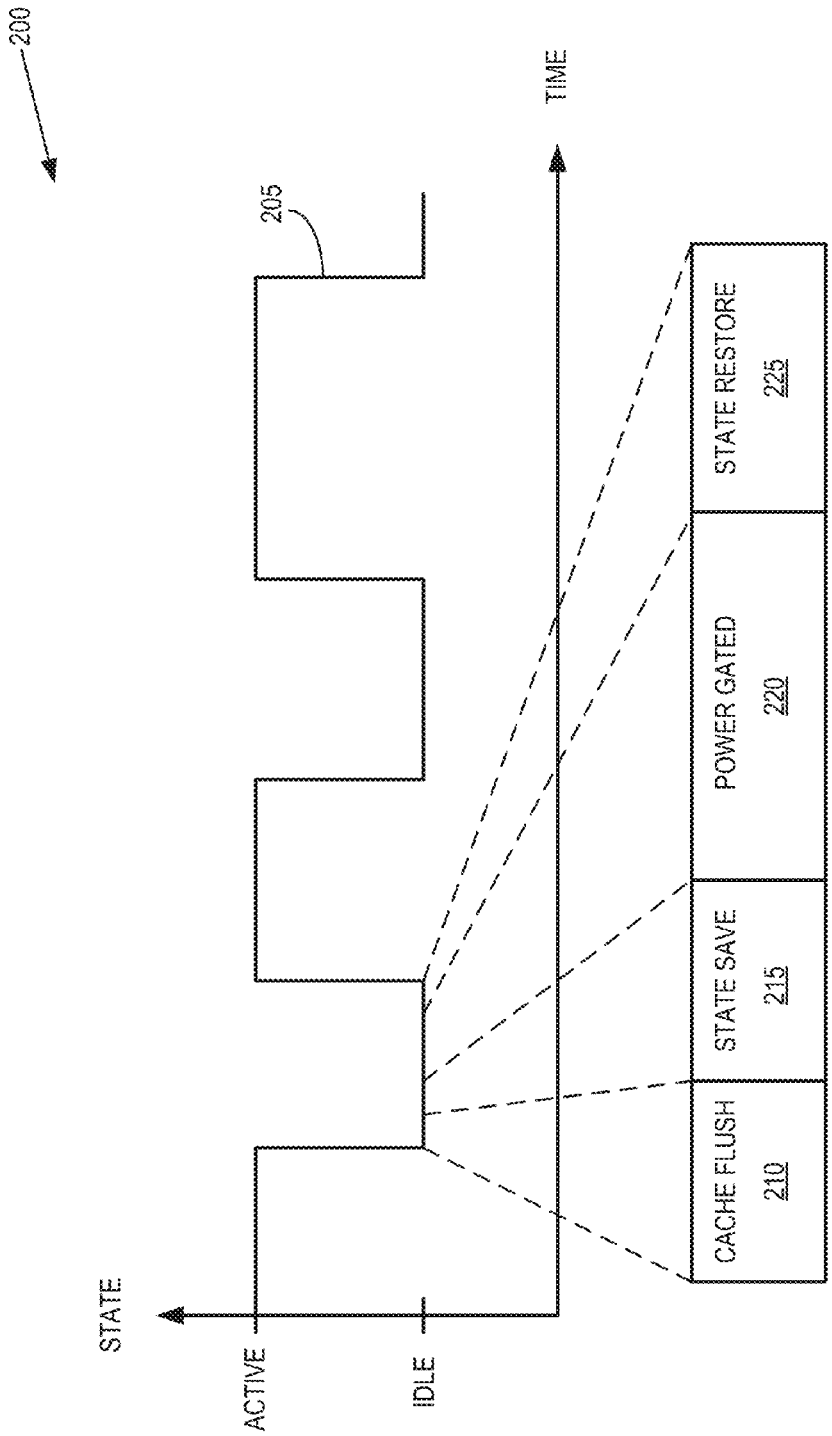
FIG. 2 is a plot that shows transitions of a component between an active state and an idle state according to some embodiments.

FIG. 2 is a plot 200 that shows transitions of a component such as the processor cores 106-109 shown in FIG. 1 between an active state and an idle state according to some embodiments. The vertical axis in FIG. 2 shows the performance state of the component (e.g., active or idle) and the vertical axis indicates time, which increases from left to right. The line 205 indicates the performance state as a function of time and shows examples of transitions between the performance states. Some embodiments of the component may be power gated in response to the component transitioning from the active state to the idle state. The power gating overhead includes the resources used during a cache flush 210 of caches such as the caches 110-114 shown in FIG. 1. The power gating overhead also includes resources used to save (at 215) information that is used to define the operating state of the processor core. For example, values in registers in the processor core may be saved to an external memory such as the DRAM 130 shown in FIG. 1. Power may be saved during the power gated state 220 since substantially no power is being supplied to the processor core. Reentering the active state (at 225) after being power gated also consumes significant resources. For example, resources are consumed to restore the operating state of the processor core, e.g., by writing stored register values from the external memory back into the registers of the processor core. The resource savings resulting from power gating one or more components should therefore be weighed against the resource cost of power gating these components and subsequently reentering the active state before deciding whether to power gate the component(s) or maintain or reenter the idle or active state.

Referring back to FIG. 1, some embodiments of the SMU 136 may therefore implement power gate logic 140 that is used to decide whether to transition between power management states. For example, the SMU 136 may use the power gate logic 140 to selectively implement one or more entry prediction techniques to determine whether to power gate components of the processing device 100. However, persons of ordinary skill in the art should appreciate that some embodiments of the processing device 100 may implement the power gate logic 140 in other locations. Portions of the power gate logic 140 may also be distributed to multiple locations within the processing device 100. The power gate logic 140 can be used to determine whether to power gate components of the processing device 100 such as the CPU 105, the GPU 120, as well as components at a finer level of granularity such as the processor cores 106-109 or cores within the GPU 120.

The power gate logic 140 may selectively implement entry prediction for power gating a component based on the reliabilities of one or more entry prediction techniques. Some embodiments of the power gate logic 140 may use confidence measures generated by the entry prediction techniques to estimate reliability of the entry prediction techniques. Some embodiments of the power gate logic 140 may use statistical models to estimate the reliability of the entry prediction techniques. Some embodiments of the power gate logic 140 may estimate the reliabilities of different entry prediction techniques using information that indicates how successful the different entry prediction techniques have been in the past. For example, entry prediction techniques that caused the component to be power gated and led to actual power savings more than a threshold percentage of the time (such as 90% of the time) may be considered to have a high reliability and may therefore be selected by the power gate logic 140 for use in determining whether to power gate the component. Entry prediction techniques that were less likely to lead to actual power savings may be considered to have a low reliability and may not be selected by the power gate logic 140 for use in determining whether to power gate the component. If none of the available entry prediction techniques have a sufficiently high reliability, a timer-based techniques, such as a cache-flush-on-hold technique, may be used to power gate the component after the component has been idle for a fixed period of time. Thus, the term "selectively implement" is understood to mean that entry prediction techniques may not be used in all circumstances.

The power gate logic 140 may use the reliabilities of one or more exit prediction techniques to selectively implement exit prediction for determining when a power-gated component is expected to transition to another performance state such as the active state. Some embodiments of the power gate logic 140 may use confidence measures, statistical models, or measures of previous success of the exit prediction techniques to estimate reliability of the exit prediction techniques. The power gate logic 140 selectively implement exit prediction techniques independently of the selective implementation of entry prediction techniques. For example, if reliability of one or more of the exit prediction techniques is above a threshold, the power gate logic 140 may select one or more exit prediction techniques for estimating when to end power gating of a component and this choice may be made independently of whether the power gate logic 140 selectively implemented entry prediction or a timer-based technique to initiate power gating of the component. For another example, if reliability of the exit prediction techniques is below a threshold, the power gate logic 140 may not use exit prediction and this decision may be made independently of whether the power gate logic selectively implemented entry prediction or a timer-based technique to initiate power gating of the component. Thus, the term "selectively implement" is understood to mean that exit prediction may not be used in all circumstances.

Figure 3:
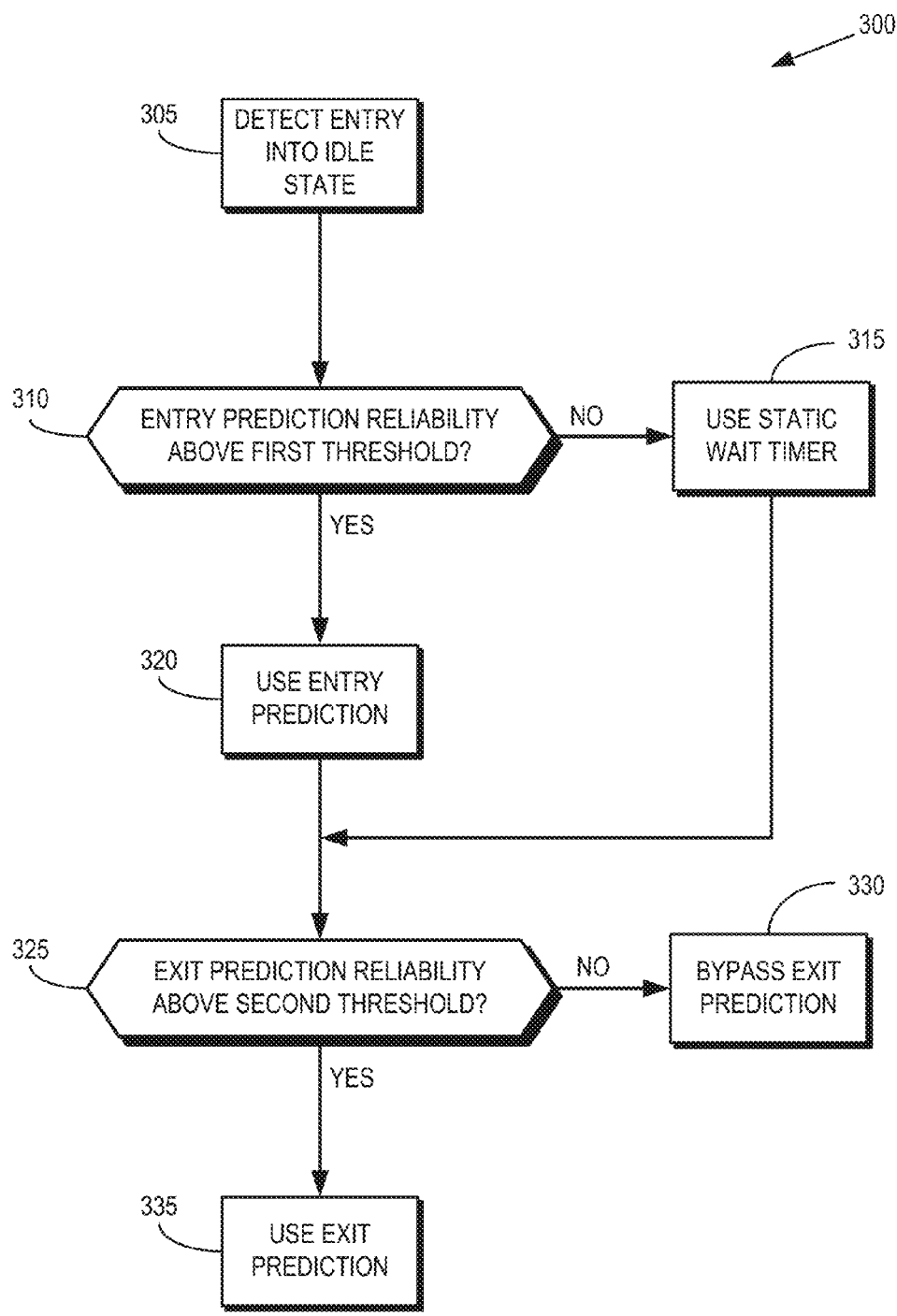
FIG. 3 is a method for independently deciding whether to use entry prediction or exit prediction for power gating a component in a processing device such as the processing device shown in FIG. 1 according to some embodiments.

FIG. 3 is a method 300 for selectively implementing entry prediction or exit prediction for power gating a component in a processing device such as the processing device 100 shown in FIG. 1 according to some embodiments. Some embodiments of the method 300 may be implemented in power gate logic such as the power gate logic 140 shown in 1. At block 305, the power gate logic detects entry of the component into an idle state. At decision block 310, the power gate logic accesses information that can be used to determine whether the reliability of one or more entry prediction techniques is above a first threshold. For example, the power gate logic may be able to access confidence measures or information that indicates how successful one or more entry prediction techniques have been in the past to determine whether the reliability is above the first threshold. For another example, the power gate logic may be able to access a statistical model that indicates, based on one or more previous idle times of the component, the probability that the current idle time will be long enough to warrant power gating the component. A high probability may indicate a correspondingly high entry prediction reliability.

If the entry prediction reliability is below the first threshold, the power gate logic may decide not to use entry prediction and may instead use (at 315) a static wait timer that indicates that the component is to be power gated if it remains in the idle state longer than a duration indicated by the static wait timer. If the entry prediction reliability is above the first threshold, the power gate logic may decide to use (at 320) entry prediction to predict whether power gating the component results in a net power savings. Some embodiments of the power gate logic may be able to choose from among multiple different entry prediction techniques. In that case, the power gate logic may use the entry prediction technique having the highest reliability or it may use a combination of entry prediction techniques that each have a reliability above the first threshold.

At decision block 325, the power gate logic accesses information that can be used to determine whether the reliability of one or more exit prediction techniques is above a second threshold. For example, the power gate logic may be able to access confidence measures or information that indicates how successful one or more exit prediction techniques have been in the past to determine whether the reliability is above the second threshold. For another example, the power gate logic may be able to access a statistical model that indicates, based on one or more previous idle times of the component, the probability that duration of the current idle time can be accurately predicted so that the exit time can be accurately predicted. A high probability may indicate a correspondingly high exit prediction reliability.

If the exit prediction reliability is below the second threshold, the power gate logic may decide to bypass (at 330) exit prediction. If the exit prediction reliability is above the second threshold, the power gate logic may decide to use (at 335) exit prediction to predict when the component should transition from the power gated state to another power management state such as an active state. Some embodiments of the power gate logic may be able to choose from among multiple different exit prediction techniques. In that case, the power gate logic may use the exit prediction technique having the highest reliability or may use a combination of exit prediction techniques that each have a reliability above the first threshold.

Figure 4:
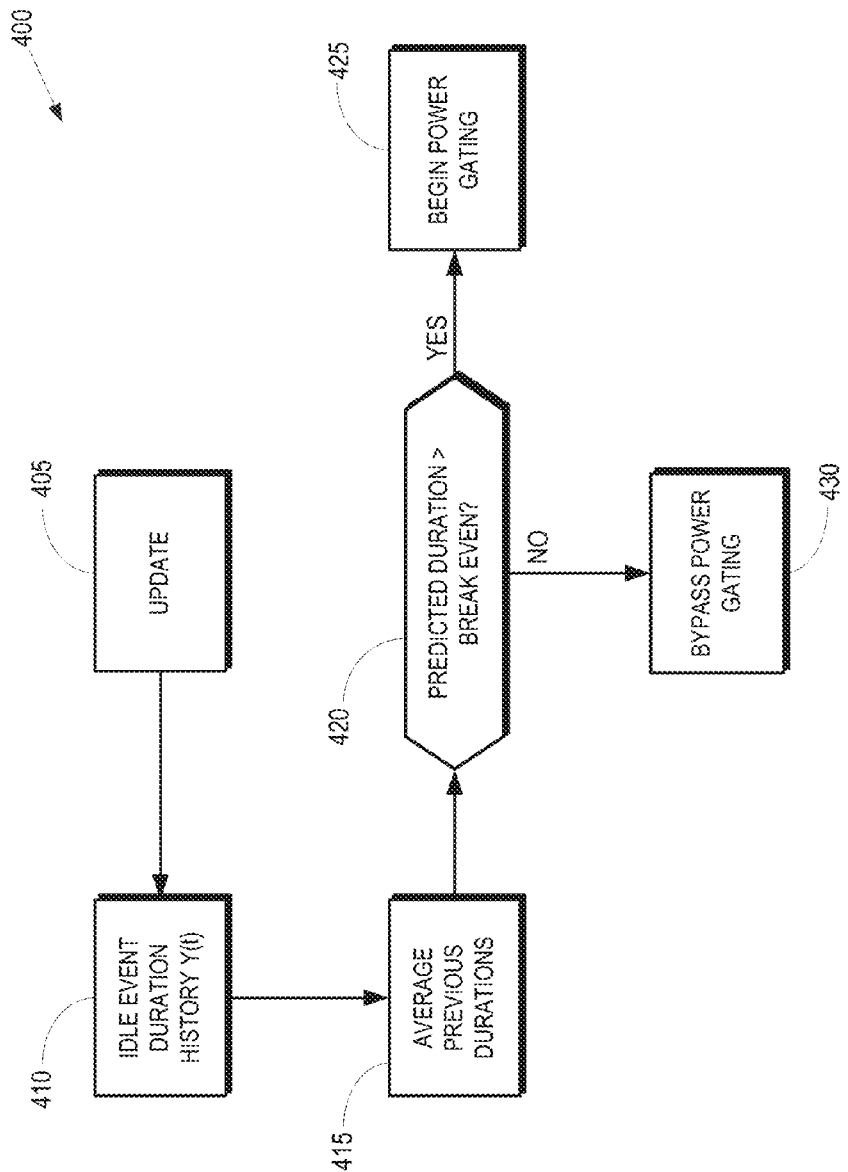
FIG. 4 is a flow diagram of a method of a technique for predicting the idle time duration of a component of a processing device according to some embodiments.

FIG. 4 is a flow diagram of a method 400 of a technique for predicting the idle time duration of a component of a processing device according to some embodiments. Some embodiments of the method 400 may be implemented in power gate logic such as the power gate logic 140 shown in FIG. 1. Since the predicted idle time duration also indicates (in combination with the entry time for the idle state) when the component is expected to transition out of the idle state, the predicted idle time duration may be used for power gating entry prediction or power gating exit prediction. Some embodiments of the method 400 may be referred to as a last value predictor.

At block 405, a value of a duration of an idle time event associated with a component in a processing device is updated, e.g., in response to the component re-activating from the idle state so that the total duration of the idle event can be measured by the last value predictor. The total duration of the idle event is the time that elapses between entering the idle state and re-activating from the idle state.

At block 410, the updated value of the duration is used to update an idle event duration history that includes a predetermined number of previous idle event durations. For example, the idle event duration history, Y(t), may include information indicating the durations of the last ten idle events so that the training length of the last value predictor is ten. The training length is equal to the number of previous idle events used to predict the duration of the next idle event.

At block 415, an average of the durations of the idle events in the idle event history is calculated, e.g., using the following formula for computing the average of the last ten idle events:

$$\overline{Y(t)} = \sum_{i=1}^{10} 0.1 * Y(t-i)$$

Some embodiments of the method 400 may use more or fewer than ten events from the idle event history to calculate the average of the durations. Some embodiments of the method 400 may also generate a measure of the prediction error that indicates the proportion of the signal that is well modeled by the last value predictor model. For example, the method 400 may produce a measure of prediction error based on the training data set. Measures of the prediction error may include differences between the durations of the idle events in the idle event history and the average value of the durations of the idle events in the idle event history. The measure of the prediction error may be used as a confidence measure for the predicted idle time duration. In some embodiments, the confidence measure may be used as a reliability measure for selectively implementing entry prediction or exit prediction. For example, the reliability for entry prediction may be considered to be high if the confidence measure for the predicted idle time duration is above a first threshold and vice versa. For another example, the reliability for exit prediction may be considered to be high if the confidence measure for the predicted idle time duration is above a second threshold and vice versa. The first and second thresholds may be different.

Some embodiments of the method 400 may use a weighted average of the previously measured values of the duration. For example, a predetermined number of linear predictor coefficients a(i) may be computed. The sequence of idle event durations may include different durations and the linear predictor coefficients a(i) may be used to define a model of the progression of idle event durations that can be used to predict the next idle event duration. At block 415, a weighted average of the durations of the idle events in the idle event history is calculated using the coefficients, e.g., using the following formula for computing the average of the last N idle events:

$$\overline{Y(t)} = \sum_{i=1}^{N} a(i) * Y(t-i)$$

Some embodiments of the linear predictor algorithm may use different training lengths and/or numbers of linear predictor coefficients. As discussed herein, some embodiments of the linear predictor algorithm may also generate a measure of the prediction error that indicates the proportion of the signal that is well modeled by the linear predictor model, e.g., how well the linear predictor model would have predicted the durations in the idle event history. The prediction error may be used to estimate reliability for selectively implementing entry prediction or exit prediction.

Some embodiments of the method 400 may filter the idle event duration history. For example, the idle event duration history may be filtered to remove outlier idle events such as events that are significantly longer or significantly shorter than the mean value of the idle event durations in the history. At block 415, a predetermined number of linear predictor coefficients a(i) may then be computed using the filtered idle event history and a weighted average of the durations of the idle events in the filtered idle event history may be calculated using the coefficients, e.g., using the following formula for computing the weighted average of the last N idle events in the filtered idle event history Y':

$$\overline{Y(t)} = \sum_{i=1}^{N} a(i) * Y'(t-i)$$

Some embodiments of the filtered linear predictor algorithm may use different filters, training lengths, and/or numbers of linear predictor coefficients. As discussed herein, some embodiments of the filtered linear predictor algorithm may also generate a measure of the prediction error that indicates the proportion of the signal that is well modeled by the linear predictor model, e.g., how well the linear predictor model would have predicted the durations in the idle event history. The prediction error may be used to estimate reliability for selectively implementing entry prediction or exit prediction.

At decision block 420, the predicted duration, which is equal to the average of the previous durations, may be compared to a breakeven duration. In some embodiments, the breakeven duration is equal to the duration at which the resource cost of power gating a component is equal to the resource savings that would result from power gating the component for the breakeven duration. The breakeven duration may therefore be determined on a component-bycomponent basis and may be determined using empirical studies, performance testing, modeling, or other techniques. A net resource savings may result if the predicted duration is greater than the breakeven duration. The processing device may therefore begin a power gating the component at 425 if the predicted duration is greater than the breakeven duration. If not, the processing device may bypass or turn off power gating the component at 430.

Figure 5:
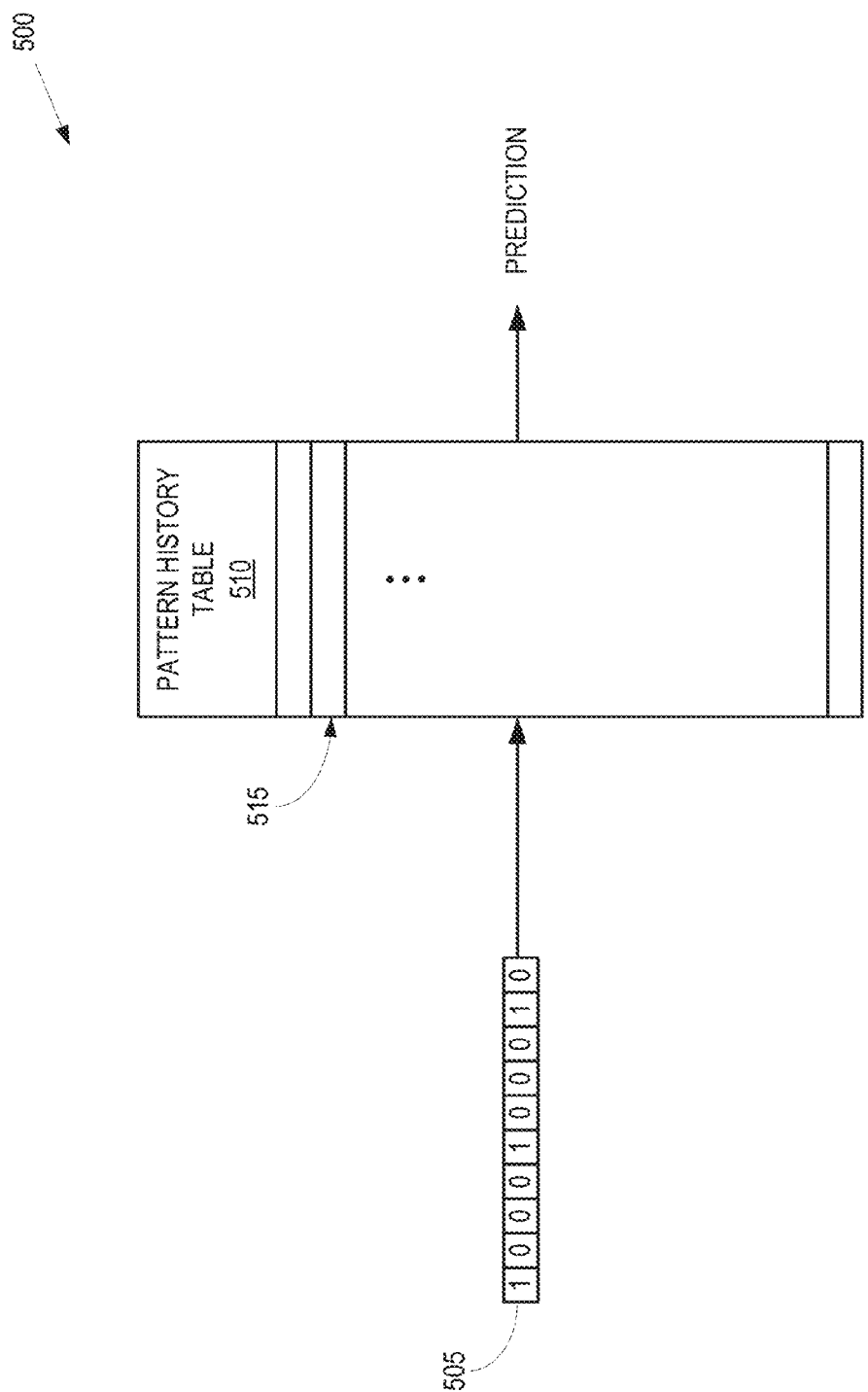
FIG. 5 is a diagram of a two-level adaptive global predictor that may be used for power gating entry prediction according to some embodiments.

FIG. 5 is a diagram of a two-level adaptive global predictor 500 that may be used for power gating entry prediction according to some embodiments. The two levels used by the global predictor 500 correspond to long and short durations of an idle time event. For example, a value of "1" may be used to indicate an idle time event that has a duration that is longer than a threshold and a value of "0" may be used to indicate an idle time event that has a duration that is shorter than the threshold. The threshold may be set based on the breakeven duration discussed herein so that levels corresponding to long durations of the idle event may be used to identify candidates for power gating. The global predictor 500 receives information indicating the duration of idle events and uses this information to construct a pattern history 505 for long or short duration events. The pattern history 505 includes information for a predetermined number N of idle time events, such as the ten idle time events shown in FIG. 5.

A pattern history table 510 includes $2^N$ entries 515 that correspond to each possible combination of long and short durations in the N idle time events. Each entry 515 in the pattern history table 510 is also associated with a saturating counter that can be incremented or decremented based on the values in the pattern history 505. An entry 515 may be incremented when the pattern associated with the entry 515 is received in the pattern history 505 and is followed by a long-duration event. The saturating counter can be incremented until the saturating counter saturates at a maximum value (e.g., all "1s") that indicates that the current pattern history 505 is very likely to be followed by a long duration idle event. An entry 515 may be decremented when the pattern associated with the entry 515 is received in the pattern history 505 and is followed by a short-duration event. The saturating counter can be decremented until the saturating counter saturates at a minimum value (e.g., all "0s") that indicates that the current pattern history 505 is very likely to be followed by a short duration idle event.

The two-level global predictor 500 may predict that an idle event is likely to be a long-duration event when the saturating counter in an entry 515 that matches the pattern history 505 has a relatively high value of the saturating counter such as a value that is close to the maximum value. A component may then be power gated in response to the two-level global predictor 500 predicting that the idle event is likely to be a long-duration event. The two-level global predictor 500 may predict that an idle event is likely to be a short-duration event when the saturating counter in an entry 515 that matches the pattern history 505 has a relatively low value of the saturating counter such as a value that is close to the minimum value. Power gating of the component may be bypassed in response to the two-level global predictor 500 predicting that the idle event is likely to be a short duration event.

Some embodiments of the two-level global predictor 500 may also provide a confidence measure that indicates a degree of confidence in the current prediction. For example, a confidence measure can be derived by counting the number of entries 515 that are close to being saturated (e.g., are close to the maximum value of all "1s" or the minimum value of all "0s") and comparing this to the number of entries that do not represent a strong bias to long or short duration idle time events (e.g., values that are approximately centered between the maximum value of all "1s" and the minimum value of all "0s"). If the ratio of saturated to unsaturated entries 515 is relatively large, the confidence measure indicates a relatively high degree of confidence in the current prediction and if this ratio is relatively small, the confidence measure indicates a relatively low degree of confidence in the current prediction. For another example, instead of checking all of the entries 515 in the pattern history table, confidence can also be measured for the entry 515 that is indexed using the pattern history 505. If the indexed entry for the current prediction shows a strong bias, then the prediction has high confidence; otherwise, the confidence level is low. Some embodiments may use the confidence measure as an indication of reliability of the power gating entry prediction.

Figure 6:
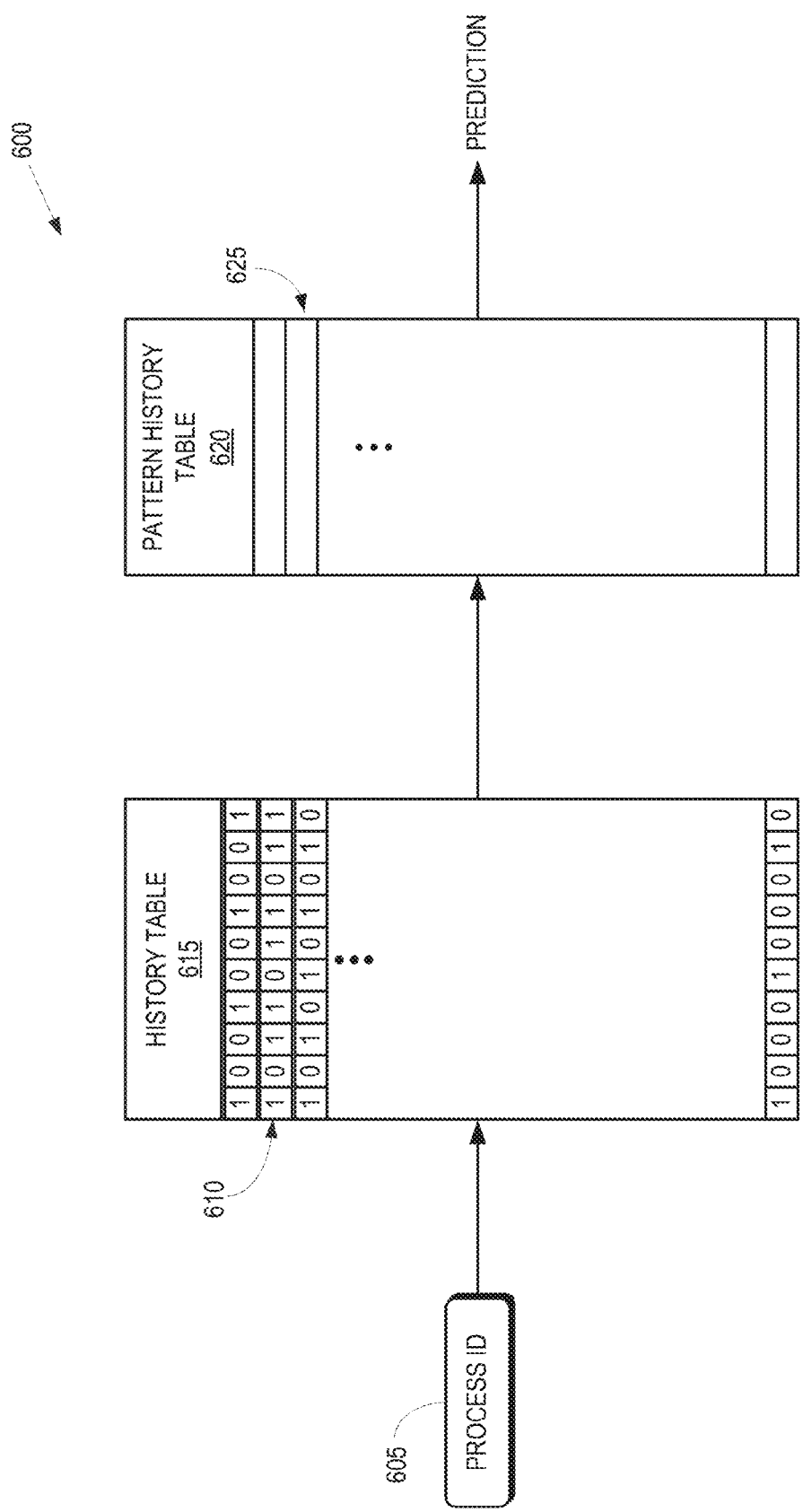
FIG. 6 is a diagram of a two-level adaptive local predictor that may be used for power gating entry prediction according to some embodiments.

FIG. 6 is a diagram of a two-level adaptive local predictor 600 that may be used for power gating entry prediction according to some embodiments. As discussed herein, the two levels used by the local predictor 600 correspond to long and short durations of a corresponding idle time event. The two-level local predictor 600 receives a process identifier 605 that can be used to identify a pattern history entry 610 in a history table 615. Each pattern history entry 610 is associated with a process and includes a history that indicates whether previous idle event durations associated with the corresponding process were long or short.

A pattern history table 620 includes $2^N$ entries 625 that correspond to each possible combination of long and short durations in the N idle time events in each of the entries 610. Some embodiments of the local predictor 600 may include a separate pattern history table 620 for each process. Each entry 625 in the pattern history table 620 is also associated with a saturating counter. As discussed herein, the entries 625 may be incremented or decremented when the pattern associated with the entry 625 matches the pattern in the entry 610 associated with the process identifier 605 and is followed by a long-duration event or a short-duration event, respectively.

The two-level local predictor 600 may then predict that an idle event is likely to be a long-duration event when the saturating counter in an entry 625 that matches the pattern in the entry 610 associated with the process identifier 605 has a relatively high value of the saturating counter such as a value that is close to the maximum value. A component may be power gated when the two-level local predictor 600 predict that the idle event is likely to be a long-duration event. The two-level global predictor 600 may predict that an idle event is likely to be a short-duration event when the saturating counter in an entry 625 that matches the pattern in the entry 610 associated with the process identifier 605 has a relatively low value of the saturating counter such as a value that is close to the minimum value. Power gating of the component may be bypassed when the two-level local predictor 600 predicts that the idle event is likely to be a short duration event.

Some embodiments of the two-level local predictor 600 may also provide a confidence measure that indicates a degree of confidence in the current prediction. For example, a confidence measure can be derived by counting the number of entries 625 that are close to being saturated (e.g., are close to the maximum value of all "1s" or the minimum value of all "0s") and comparing this to the number of entries 625 that do not represent a strong bias to long or short duration idle time events (e.g., values that are approximately centered between the maximum value of all "1s" and the minimum value of all "0s"). If the ratio of saturated to unsaturated entries 625 is relatively large, the confidence measure indicates a relatively high degree of confidence in the current prediction and if this ratio is relatively small, the confidence measure indicates a relatively low degree of confidence in the current prediction. For another example, instead of checking all of the entries 625 in the pattern history table 620, confidence can also be measured for the entry 625 that is indexed using an entry 610 from the pattern history table 615. If the indexed entry for the current prediction shows a strong bias, then the prediction has high confidence; otherwise, the confidence level is low. Some embodiments may use the confidence measure as an indication of the reliability of the power gating entry prediction.

Figure 7:
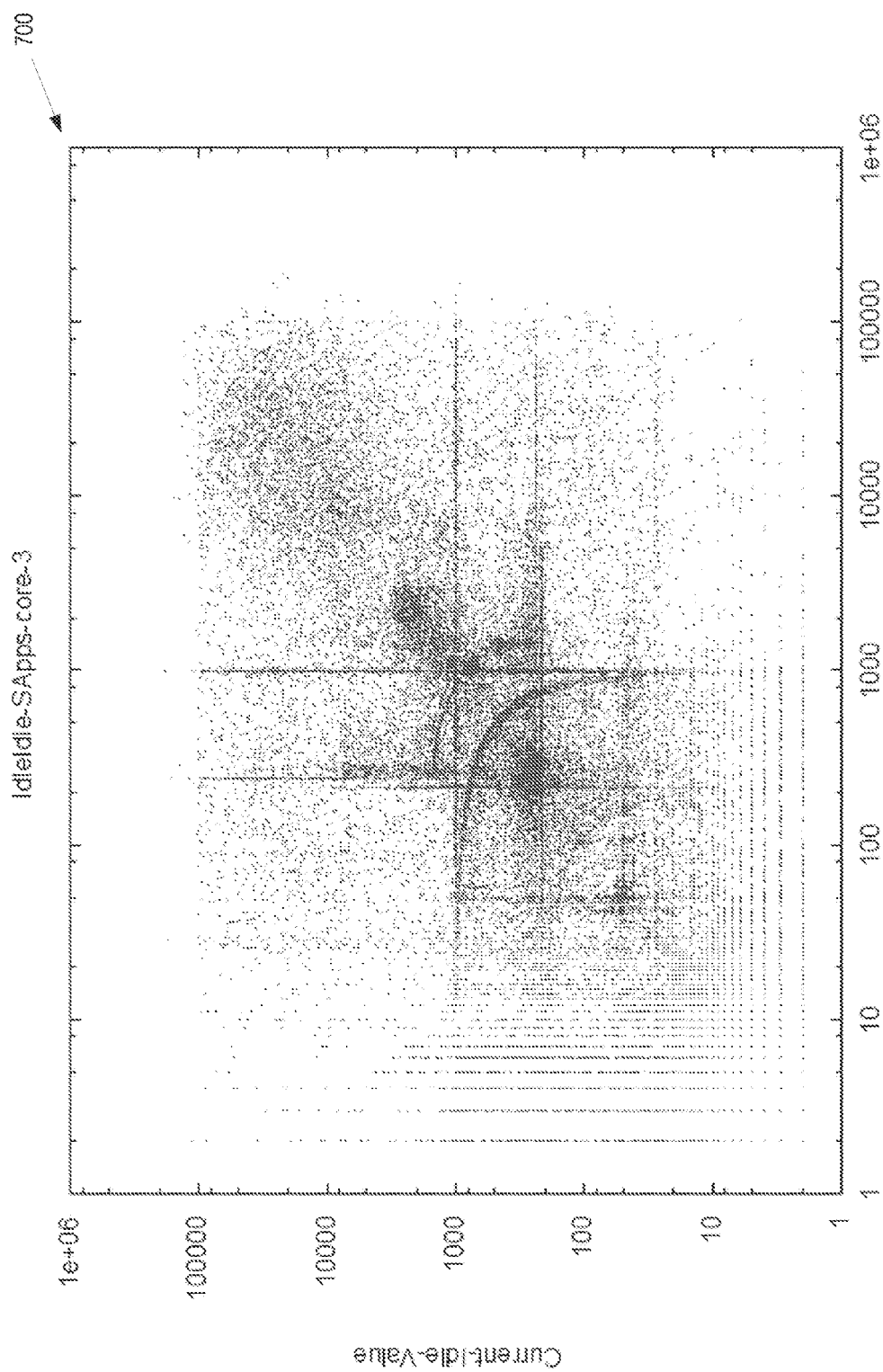
FIG. 7 is a scatterplot of durations of idle events for one or more components of a processing device according to some embodiments.

FIG. 7 is a scatterplot 700 of durations of idle events for one or more components of a processing device according to some embodiments. The vertical axis of the scatterplot 700 indicates a duration (in microseconds) of the idle event and the horizontal axis of the scatterplot 700 indicates a duration (in microseconds) of a prior idle event. In some embodiments, the duration of the prior idle event indicated on the horizontal axis is the duration of the idle event immediately preceding the current idle event indicated on the vertical axis. If a component enters a first idle event, reactivates, and then enters a second idle event, a point corresponding to the second idle event may be placed in the scatterplot 700 at a location given by the duration of the second idle event (on the vertical axis) and the duration of the first idle event (on the horizontal axis). For example, if the duration of the first idle event is 100 μs and the duration of the second idle event is 1000 μs, a point corresponding to the second idle event may be placed in the scatterplot 700 at the location (100, 1000). Points may be added to the scatterplot 700 in response to a component reactivating (or otherwise leaving) the idle state. The scatterplot 700 may include data associated with a single component or multiple components of the processing device.

Patterns in the scatterplot 700 may be used to predict durations of idle events. For example, the high density of points in the scatterplot 700 near the location (2500, 2500) may indicate that the duration of an idle event of a component is very likely to be 2500 μs if the duration of the components previous idle event was 2500 μs. Patterns in the scatterplot 700 may also be used to estimate the reliability of predictions of the durations of idle events. For example, the high density of the points and the scatterplot 700 near the location (2500, 2500) may indicate that the prediction is reliable if the density is significantly higher than the density of any other peaks along the vertical line corresponding to a previous duration of 2500 μs. For another example, the vertical line corresponding to a previous duration of 1000 μs indicates that an idle event that has a duration of 1000 μs is about equally likely to be followed by an idle event of any duration between 10 μs and 100,000 μs. Consequently, the reliability of a prediction of a current idle event duration based upon a previous duration of 1000 μs is expected to be low. Horizontal lines in the scatterplot 700 may indicate that any previous duration is likely to be followed by an idle event having the duration corresponding to the vertical line. Horizontal lines and vertical lines in the scatterplot 700 are typically artifacts of timescales defined by the operating system or other applications in the processing device.

The estimated reliabilities may be used to independently decide whether to use entry prediction or exit prediction, i.e. they may be used for selective implementation of entry prediction or exit prediction. For example, the reliability of exit prediction may be low if the duration of a previous idle event was 1000 μs because the duration of the next idle event is approximately equally likely to have any duration between 10 μs and 100,000 μs. Exit prediction may therefore be turned off for the current idle event. However, entry prediction using the scatterplot 700 or other techniques such as those discussed herein may still be used to decide whether to enter the power gated state, depending on the reliability of the entry prediction techniques. For another example, the reliability of entry prediction and exit prediction may be high if the duration of the previous idle event was approximately 2500 μs. Entry prediction and exit prediction may both be used in this case, e.g., power gate logic may power gate the component when the duration of the previous idle event is approximately 2500 μs and may reactivate the component approximately 2500 μs later. Some embodiments may also turn off entry prediction while leaving exit prediction turned on if the reliability of entry prediction is low and the reliability of exit prediction is high. Neither entry prediction nor exit prediction may be used if the reliability of entry prediction is low and the reliability of exit prediction is low.

Models of the relationships between previous idle events and current idle events may be defined using the scatterplot 700. In some embodiments, a model may be defined to indicate the mean value of a duration of a current idle event for each duration of a previous idle event or for one or more ranges of durations of the previous idle event. The model may also define probabilities, expectations, conditional averages, or confidence measures on the mean/average. For example, if the duration of the previous idle event is in the range 200-300 μs, a linear model may be defined that predicts that the duration of the current idle event is likely to be the same as the duration of the previous idle event. A similar model may also be used in the range 1000-3000 μs. In the range 300-900 μs for durations of the previous idle event, the scatterplot 700 shows a high density arc of points. Consequently, the model in this range may be defined so that the expected duration of the current idle event is equal to 1000 μs minus the duration of the previous idle event.

In some embodiments, the models may be defined in higher dimensions. For example, a three-dimensional model may be generated to predict the duration of the current idle event based on durations of the last two immediately preceding idle events. The models may also include predictions based on the duration of the active periods between the idle events or the durations of sums of previous active and idle periods. The scatterplot 700 and the models derived therefrom may use information gathered on a per-component basis (e.g., for a single processor core) or for combinations of different components. Embodiments of the statistical models derived from the scatterplot 700 may be used in conjunction with other techniques for entry prediction or exit prediction, such as the entry and exit prediction techniques described herein.

Although the scatterplot 700 has been used to represent the relationship between durations of past idle events and durations of current idle events, some embodiments may use other representations of this relationship. For example, the relationship between the durations of past idle events and durations of current idle events may be represented using N-dimensional histograms, hash buckets, or other data structures.

Figure 8:
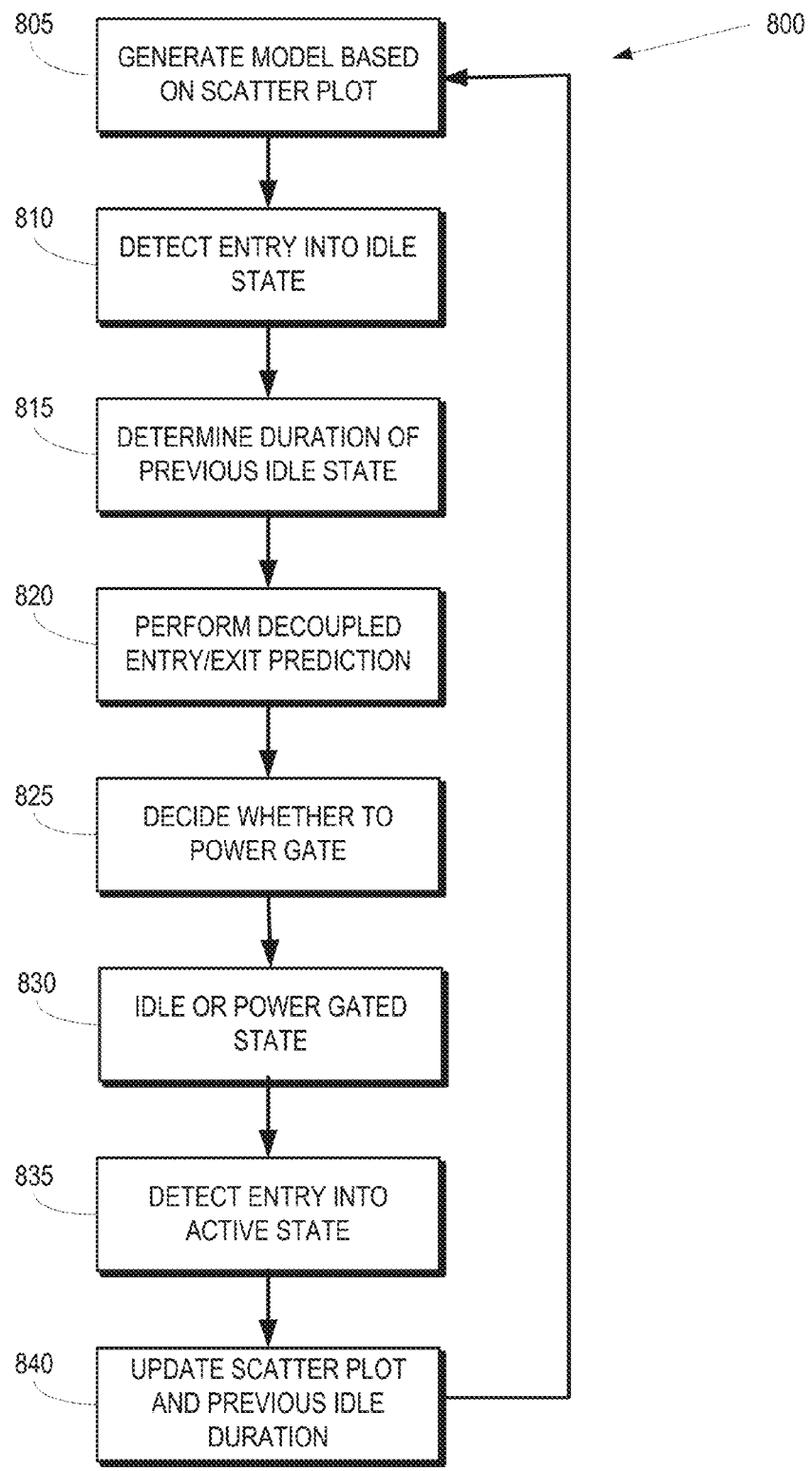
FIG. 8 is a flow diagram of a method for maintaining a decoupled entry/exit prediction model based on a scatterplot such as the scatterplot shown in FIG. 7 according to some embodiments.

FIG. 8 is a flow diagram of a method 800 for maintaining a decoupled entry/exit prediction model based on a scatterplot such as the scatterplot 700 shown in FIG. 7 according to some embodiments. Some embodiments of the method 800 may be implemented by power gate logic such as the power gate logic 140 shown in FIG. 1. At block 805, the power gate logic generates a model based on a scatterplot that relates the durations of a current idle event to one or more durations of idle event that occurred prior to the current idle event. At block 810, the power gate logic detects entry into an idle state. For example, the power gate logic may detect a component such as one of the processor cores 106-109 shown in FIG. 1 entering an idle state. In response to detecting entry into the idle state, the power gate logic determines a duration of a previous idle event at block 815. The duration of the previous idle state may be determined using information stored in a register associated with the component or in some other stories location.

At block 820, the power gate logic uses the duration of the previous idle state to perform decoupled entry/exit prediction for power gating the idle component. Some embodiments of the power gate logic may perform the decoupled entry/exit prediction using embodiments of the method 300 shown in FIG. 3. Reliabilities of the entry prediction techniques or the exit prediction techniques may be determined using the model generated from the scatterplot (at block 805) or using other measures of the reliabilities that may be determined for different entry or exit prediction techniques, as discussed herein.

At block 825, the power gate logic decides whether to power gate the idle component. The power gate logic may decide to power gate the idle component based on an entry prediction technique if the reliability of one or more entry prediction techniques is above a threshold, as discussed herein. Otherwise, the power gate logic may decide to power gate the idle component using a timer-based technique. The power gate logic may also decide whether to use exit prediction to determine when to reactivate the component if the reliability of one or more exit prediction techniques is above a threshold, as discussed herein. If exit prediction is used, the power gate logic may cause the power gated component to enter the active state at a time determined based on the predicted exit time. Otherwise, the power gated component may remain in the power gated state until it is instructed to enter the active state, e.g., in response to an interrupt generated by the operating system.

At block 830, the component is in either the idle state or the power gated state. At block 835, the power gate logic detects entry of the component into the active state from the idle or power gated state. The power gate logic may therefore determine the duration of the current idle state. At block 840, the power gate logic updates the scatterplot using the determined duration of the current idle state and one or more previous durations of idle states, as discussed herein. The updated scatterplot can then be used to generate or update the model at block 805.

In some embodiments, the apparatus and techniques described above are implemented in a system comprising one or more integrated circuit (IC) devices (also referred to as integrated circuit packages or microchips), such as the power gate logic described above with reference to FIGS. 1-8. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 9:
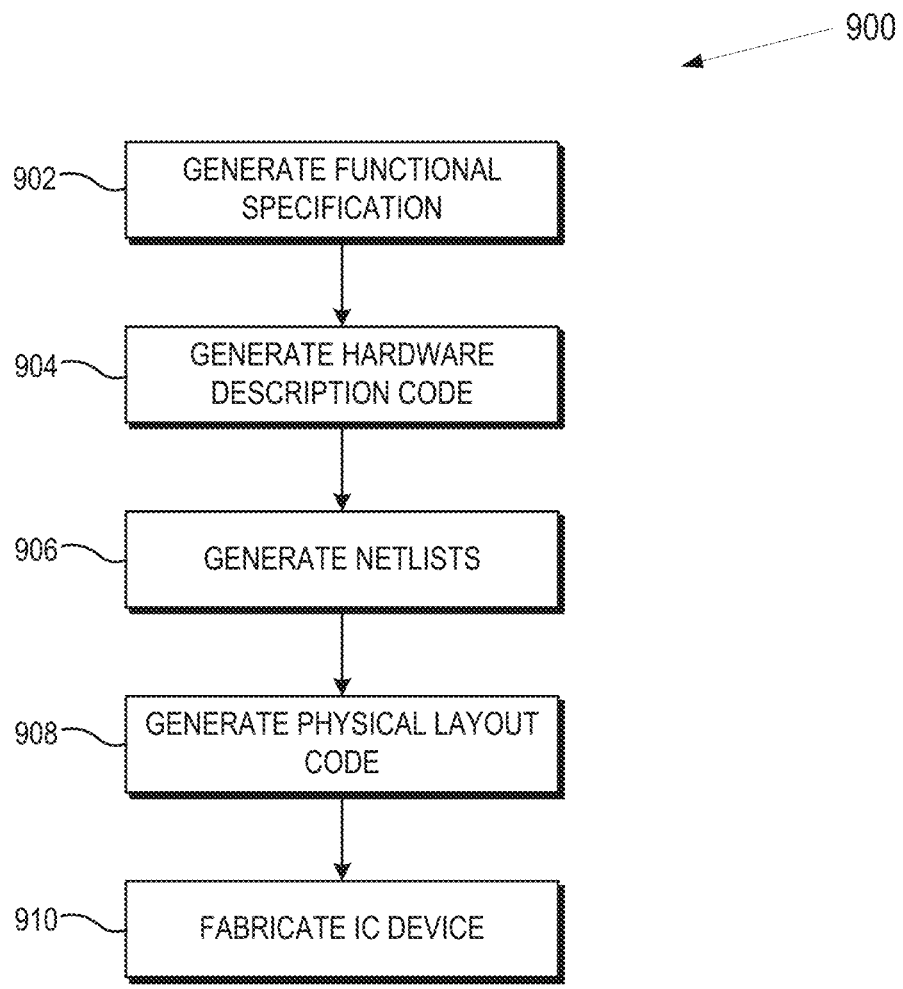
FIG. 9 is a flow diagram illustrating a method for designing and fabricating an integrated circuit device implementing at least a portion of a component of a processing device in accordance with some embodiments.

FIG. 9 is a flow diagram illustrating an example method 900 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 902 a functional specification for the IC device is generated. The functional specification (often referred to as a micro architecture specification (MAS)) may be represented by any of a variety of programming languages or modeling languages, including C, C++, SystemC, Simulink, or MATLAB.

At block 904, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 906 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 908, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist (s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 910, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may be implemented by one or more processors of a processing device executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to a component of a processing device entering an idle state,
   selectively implementing by the processing device one or more entry prediction techniques for power gating the component based on first estimates of reliability of the one or more entry prediction techniques, the first estimates of reliability indicating predicted likelihoods that the one or more entry prediction techniques will result in power savings; and
   selectively implementing by the processing device one or more exit prediction techniques for exiting the power gated state based on second estimates of reliability of the one or more exit prediction techniques, the second estimates of reliability indicating predicted likelihoods that the one or more exit prediction techniques will result in power savings.

2. The method of claim 1, wherein selectively implementing one or more of the entry prediction techniques comprises:
   using one or more of the entry prediction techniques to decide whether the component is to enter a power gated state in response to the estimates of the reliabilities of one or more of the entry prediction techniques exceeding a first threshold and, in response to the estimates of the reliabilities of the entry prediction techniques being below the first threshold, using a static wait timer indicate when the component is to enter the power gated state.

3. The method of claim 2, wherein selectively implementing one or more of the exit prediction techniques comprises using one or more of the exit prediction techniques to determine when to exit the power gated state in response to the estimates of the reliability of one or more of the exit prediction techniques exceeding a second threshold and bypassing use of the exit prediction techniques in response to the estimates of the reliability of the exit prediction techniques being below the second threshold.

4. The method of claim 1, further comprising:
estimating the reliabilities of the entry prediction techniques and the exit prediction techniques based on a model that predicts a duration of an idle state of the component based on at least one previous duration of the idle state of the component.

5. The method of claim 4, further comprising:
generating the model based on a representation of relationships between previous durations of the idle state of the component and a duration of at least one preceding idle state of the component.

6. The method of claim 5, further comprising:
generating the model based on a representation of relationships between previous durations of the idle state of the component and the duration of at least one preceding idle state of the component and a duration of at least one preceding active state of the component.

7. The method of claim 6, further comprising:
in response to the component transitioning from the idle state to an active state, updating the representation and updating the model based on the updated representation.

8. An apparatus comprising:
a processing device comprising power gating logic to, in response to a component of the processing device entering an idle state, selectively implement one or more entry prediction techniques for power gating the component based on first estimates of reliability of the entry prediction techniques, the first estimates of reliability indicating predicted likelihoods that the one or more entry prediction techniques will result in power savings, and to selectively implement one or more exit prediction techniques for exiting the power gated state based on second estimates of reliability of the exit prediction techniques, the second estimates of reliability indicating predicted likelihoods that the one or more exit prediction techniques will result in power savings.

9. The apparatus of claim 8, wherein the power gating logic is to use one or more of the entry prediction techniques to decide whether the component is to enter a power gated state in response to the estimates of the reliability of one or more of the entry prediction techniques exceeding a first threshold, and wherein the power gating logic is to use, in response to the estimates of the reliability of the entry prediction techniques being below the first threshold, a static wait timer to indicate when the component is to enter the power gated state.

10. The apparatus of claim 9, wherein the power gating logic is to use one or more of the exit prediction techniques to determine when to exit the power gated state in response to the estimates of the reliability of one or more of the exit prediction techniques exceeding a second threshold, and wherein the power gating logic is to bypass use of the exit prediction techniques in response to the estimates of the reliability of the exit prediction techniques being below the second threshold.

11. The apparatus of claim 8, wherein the power gating logic is to estimate the reliabilities of the entry prediction techniques and the exit prediction techniques based on a model that predicts a current duration of an idle state of the component based on at least one previous duration of the idle state of the component.

12. The apparatus of claim 11, wherein the power gating logic is to generate the model based on a representation of a relationship between previous durations of the idle state of the component and a duration of at least one preceding idle state of the component.

13. The apparatus of claim 12, wherein the power gating logic is to generate the model based on a representation of a relationship between previous durations of the idle state of the component and the duration of at least one preceding idle state of the component and a duration of at least one preceding active state of the component.

14. The apparatus of claim 13, wherein the power gating logic is to detect transition of the component from the idle state to an active state, and wherein the power gating logic is to update the representation in response to detecting the transition and update the model based on the updated representation.

15. A non-transitory computer readable medium embodying a set of executable instructions, the set of executable instructions to manipulate at least one processor to:
in response to a component of said at least one processor entering an idle state, selectively implement one or more entry prediction techniques for power gating the component based on first estimates of reliability of the entry prediction techniques, the first estimates of reliability indicating predicted likelihoods that the one or more entry prediction techniques will result in power savings, and to selectively implement one or more exit prediction techniques for exiting the power gated state based on second estimates of reliability of the exit prediction techniques, the second estimates of reliability indicating predicted likelihoods that the one or more exit prediction techniques will result in power savings.

16. The non-transitory computer readable medium of claim 15, further embodying a set of executable instructions to manipulate said at least one processor to use one or more of the entry prediction techniques to determine whether the component is to enter a power gated state in response to the estimates of the reliability of one or more of the entry prediction techniques exceeding a first threshold and, in response to the estimates of the reliability of the entry prediction techniques being below the first threshold, use a static wait timer to indicate when the component is to enter the power gated state.

17. The non-transitory computer readable medium of claim 15, further embodying a set of executable instructions to manipulate said at least one processor to use one or more of the exit prediction techniques to determine when to exit the power gated state in response to the estimates of the reliability of one or more of the exit prediction techniques exceeding a second threshold and bypassing use of the exit prediction techniques in response to the estimates of the reliability of the exit prediction techniques being below the second threshold.

18. The non-transitory computer readable medium of claim 15, further embodying a set of executable instructions to manipulate said at least one processor to estimate the reliabilities of the entry prediction techniques and the exit prediction techniques based on a model that predicts a current duration of an idle state of the component based on at least one previous duration of the idle state of the component.

19. The non-transitory computer readable medium of claim 18, further embodying a set of executable instructions to manipulate said at least one processor to generate the model based on a representation of relationships between previous durations of the idle state of the component and a duration of at least one of a preceding idle state of the component and a duration of at least one preceding active state of the component.

20. The non-transitory computer readable medium of claim 19, further embodying a set of executable instructions to manipulate said at least one processor to detect transition of the component from the idle state to an active state, update the representation in response to detecting the transition, and update the model based on the updated representation.

* * * * *